(12) United States Patent
Adelson et al.

(10) Patent No.: US 9,198,041 B2
(45) Date of Patent: Nov. 24, 2015

(54) METHOD OF AND SYSTEM FOR AUTHENTICATING A USER TO OPERATE AN ELECTRICAL DEVICE

(71) Applicant: Nextek Power Systems, Inc., Detroit, MI (US)

(72) Inventors: Alex M. Adelson, Andes, NY (US); Sebastien Gouin-Davis, Detroit, MI (US)

(73) Assignee: Nextek Power Systems, Inc., Detroit, MI (US)

( * ) Notice: Subject to any disclaimer, the term of this patent is extended or adjusted under 35 U.S.C. 154(b) by 0 days.

(21) Appl. No.: 14/444,299

(22) Filed: Jul. 28, 2014

(65) Prior Publication Data

US 2015/0034717 A1 Feb. 5, 2015

Related U.S. Application Data

(60) Provisional application No. 61/862,134, filed on Aug. 5, 2013.

(51) Int. Cl.
*G06K 5/00* (2006.01)
*H04W 12/06* (2009.01)
*G06K 7/10* (2006.01)

(52) U.S. Cl.
CPC ........... *H04W 12/06* (2013.01); *G06K 7/10722* (2013.01); *G06K 7/10732* (2013.01)

(58) Field of Classification Search
CPC . G06F 21/31; G06F 21/04; G06F 2221/2149; H04L 9/3226
USPC ........................................................ 235/382
See application file for complete search history.

(56) References Cited

U.S. PATENT DOCUMENTS

| | | | |
|---|---|---|---|
| 8,251,290 B1 | 8/2012 | Bushman | |
| 2008/0000981 A1* | 1/2008 | Niwa et al. | 235/462.01 |
| 2008/0304891 A1 | 12/2008 | Saijo | |
| 2009/0288159 A1* | 11/2009 | Husemann et al. | 726/16 |
| 2010/0115591 A1* | 5/2010 | Kane-Esrig | 726/5 |
| 2010/0275010 A1 | 10/2010 | Ghirardi | |
| 2011/0219427 A1 | 9/2011 | Hito | |
| 2012/0068818 A1 | 3/2012 | Mizon | |
| 2012/0168497 A1 | 7/2012 | Yach | |
| 2012/0222102 A1* | 8/2012 | Hirose | 726/7 |
| 2012/0233669 A1 | 9/2012 | Husemann | |
| 2012/0250065 A1* | 10/2012 | Partridge et al. | 358/1.14 |
| 2013/0031623 A1 | 1/2013 | Sanders | |
| 2013/0037608 A1* | 2/2013 | Evevsky | 235/380 |
| 2013/0043302 A1 | 2/2013 | Powlen | |
| 2013/0054271 A1 | 2/2013 | Langford | |
| 2013/0111208 A1 | 5/2013 | Sabin | |

(Continued)

*Primary Examiner* — Thien M Le
*Assistant Examiner* — Claude J Brown
(74) *Attorney, Agent, or Firm* — Kirschstein, Israel, Schiffmiller & Pieroni, P.C.

(57) ABSTRACT

A user is authenticated to operate an electrical device in a network, by encoding an identification symbol with identification data that identifies the user, and by encoding a composite symbol with the identification data and with operating data that enables the electrical device to be operated. The composite symbol is associated with the electrical device to be operated. An image of the identification symbol, and an image of the composite symbol, are captured and compared. The user is enabled to operate the electrical device when the identification data in the composite symbol matches the identification data in the identification symbol.

18 Claims, 3 Drawing Sheets

(56) References Cited

U.S. PATENT DOCUMENTS

| | | |
|---|---|---|
| 2013/0144698 A1 | 6/2013 | De |
| 2013/0173915 A1* | 7/2013 | Haulund ........................ 713/159 |
| 2013/0244615 A1* | 9/2013 | Miller .......................... 455/411 |
| 2013/0257590 A1* | 10/2013 | Kuenzi et al. ................ 340/5.65 |
| 2013/0291056 A1* | 10/2013 | Gaudet et al. .................... 726/1 |
| 2015/0230085 A1* | 8/2015 | Xue ................. G06F 17/30725 726/6 |

\* cited by examiner

METHOD OF AND SYSTEM FOR AUTHENTICATING A USER TO OPERATE AN ELECTRICAL DEVICE

CROSS-REFERENCE TO RELATED APPLICATION

This application claims the priority of U.S. provisional patent application Ser. No. 61/862,134, filed Aug. 5, 2013, the entire contents of which are incorporated herein by reference thereto.

FIELD OF THE DISCLOSURE

The present disclosure relates generally to a method of, and a system for, authenticating one or more users to operate one or more electrical devices in a network.

BACKGROUND

Network-based equipment, information and services need to be protected from unintended or unauthorized access, change or destruction, and is of growing importance in line with the increasing reliance on online computer systems of most societies worldwide. Hence, authenticating the identity of an individual user to reduce the risk of unauthorized access to such equipment is critical for system security. Various techniques for authenticating the identity of the user generally include requiring the presentation of a first factor defined by something the user knows (e.g., a password, a personal identification number (PIN), etc.) in combination with at least one other factor, such as something the user has (e.g., a smart card, a hardware or software token, etc.) and/or something the user is (e.g., a biometric characteristic).

As advantageous as such authentication techniques are, however, they are generally made available only to those governmental, medical, scientific, and engineering organizations requiring the highest security protocols and are seldom granted to more conventional commercial users, such as business offices. The availability of such authentication techniques is limited by the desire on the part of the commercial users to keep their operational costs down. Multi-factor credentials are expensive, require end-user training, and require sophisticated support processes. Hardware and software tokens add to additional system costs. Larger deployments also have to factor in the increased costs associated with inventory management, shipment, and replacement of such tokens.

Accordingly, there is a need to authenticate one or more users to operate one or more electrical devices or equipment in a network in a more cost-efficient manner without sacrificing system security.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
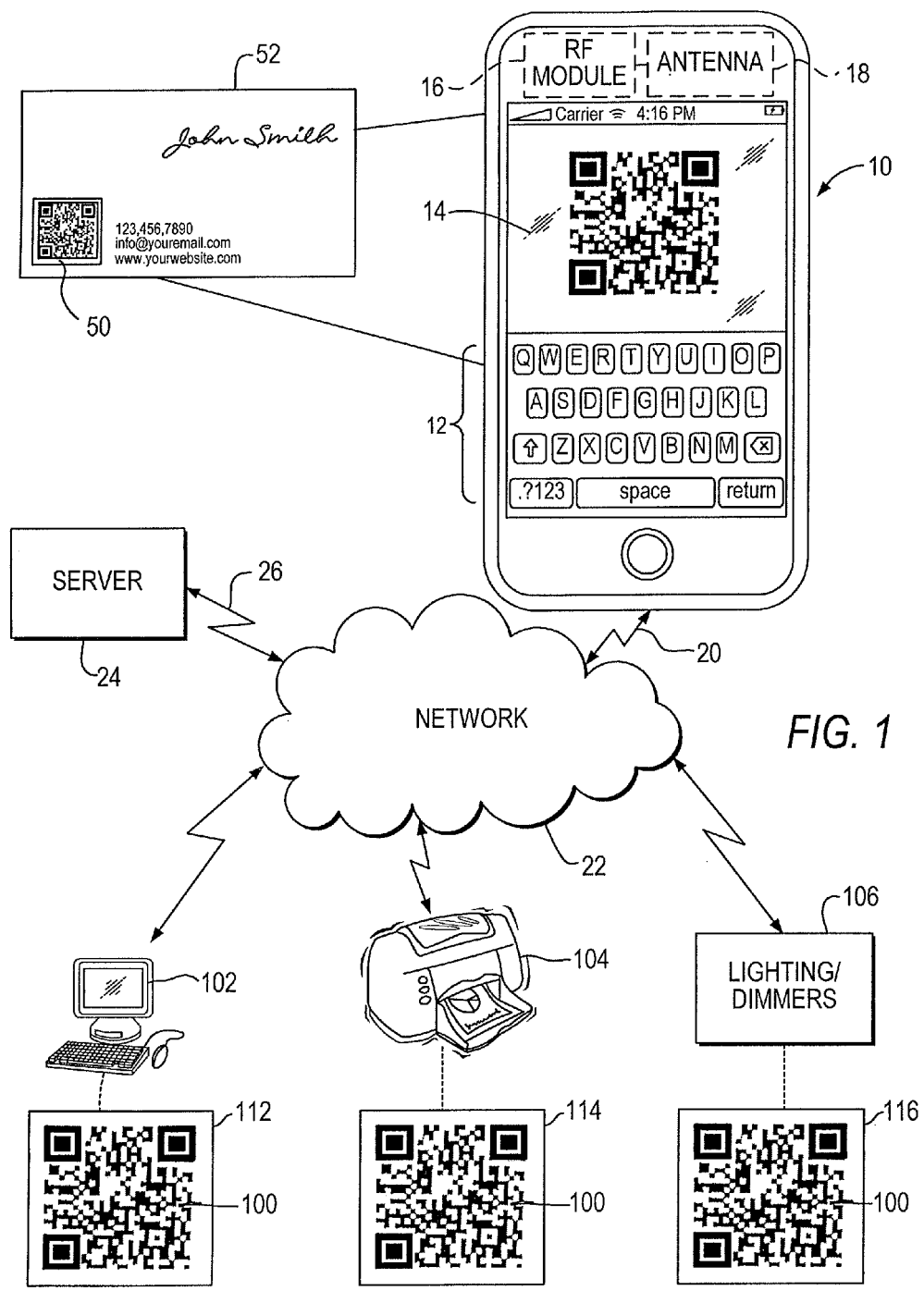
FIG. 1 is a diagrammatic view of a system for authenticating a user to operate one or more electrical devices in a network in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one feature of this invention, a method of authenticating a user to operate an electrical device in a network is performed by encoding an identification symbol with identification data that identifies the user, by capturing and storing an image of the identification symbol, by encoding a composite symbol with the identification data and with operating data that enables the electrical device to be operated, by associating the composite symbol with the electrical device to be operated, by capturing an image of the composite symbol, by comparing the images, and by enabling the user to operate the electrical device when the identification data in the composite symbol matches the identification data in the identification symbol.

Advantageously, the identification symbol is printed on a portable medium, e.g., a card, a badge, or the like, carried by the user, and is preferably configured as a two-dimensional symbol, e.g., a Quick Response (QR) code, a Portable Data File (PDF) 417 code, a Data Matrix (DM) code, or the like. All of these codes are capable of storing data in a quantity much greater than the conventional one-dimensional Universal Product Code (UPC) symbol. Each image is captured by a solid-state imaging sensor mounted in a mobile communications device, such as a smartphone or cellphone having a built-in camera, carried and operated by the user.

The composite symbol, which likewise may be configured as a two-dimensional symbol, e.g., a QR code, a PDF417 code, a DM code, or the like, is displayed in close association with the electrical device to be operated. Preferably, the composite symbol is printed on a medium, e.g., a sheet of paper, which is affixed in the vicinity of the electrical device to be operated. If the electrical device has a screen, then the composite symbol may be displayed thereon. The composite symbol is preferably encoded with a plurality of identification data from a group of users, each enabled to operate the electrical device when the identification data for any individual user in the composite symbol matches the identification data in the identification symbol for that individual user.

The printing of the identification symbol and the composite symbol is a very cost-effective authentication technique for commercial users to keep their operational costs down. End-user training, sophisticated support processes, and hardware and software tokens are no longer required. The large data storage available in the composite symbol enables multiple users to independently access each electrical device.

In accordance with another feature of this invention, a system for authenticating a user to operate an electrical device in a network, includes an identification symbol encoded with identification data that identifies the user, and a composite symbol encoded with the identification data and with operating data that enables the electrical device to be operated. The composite symbol is associated with the electrical device to be operated. A solid-state imaging sensor captures an image of the identification symbol, and also captures an image of the composite symbol. A controller compares the images, and enables the user to operate the electrical device when the identification data in the composite symbol matches the identification data in the identification symbol.

Figure 2:
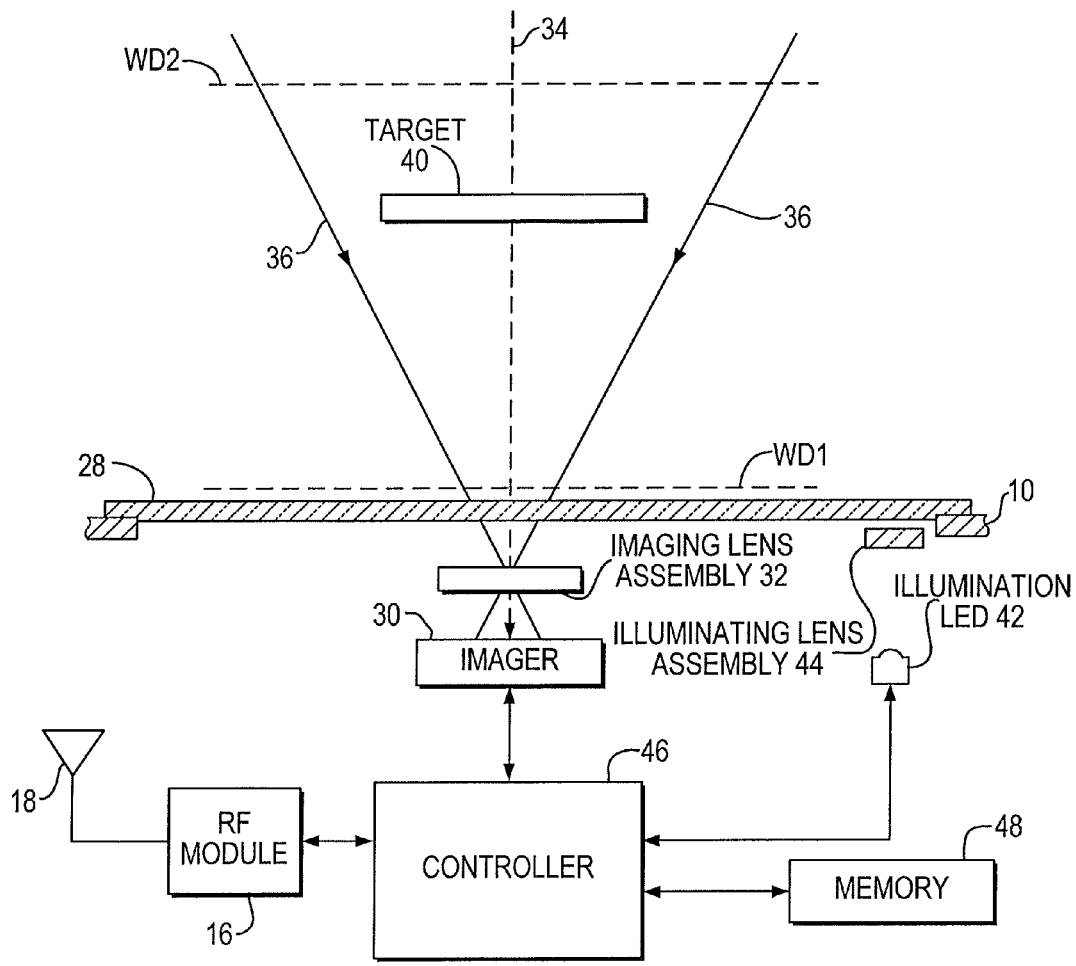
FIG. 2 is a diagrammatic view of some of the components mounted in a mobile communications device depicted in FIG. 1.

Turning now to the drawings, reference numeral 10 in FIG. 1 generally identifies a mobile communications device, such as a smartphone or cellphone, having, among other things, a keyboard 12, a display screen 14, a radio frequency (RF) transceiver module 16, and an antenna 18 operative for communicating over a bi-directional wireless link 20 with a network 22 that is in communication over a bi-directional wireless link 26 with a network server 24. As schematically shown in FIG. 2, the communications device 10 includes a built-in camera having an imager or image sensor 30 and an imaging lens assembly 32 mounted behind a rear window 28 on the communications device 10. The sensor 30 is a solid-state device, for example, a charge coupled device (CCD) or a complementary metal oxide semiconductor (CMOS) device having an array of addressable photocells or pixels arranged in mutually orthogonal rows and columns, and operative for detecting return light captured by the imaging lens assembly 32 over a field of view 36 centered on an imaging or optical axis 34 through the rear window 28. The return light is scattered and/or reflected from a target 40, as described below, over the field of view. The target 40 may be located anywhere in a working range of distances between a close-in working distance (WD1) and a far-out working distance (WD2) relative to the window 28.

In order to increase the amount of the return light captured by the sensor 30, especially in dimly lit environments and/or at far range reading, an illuminating light assembly is also mounted in the device 10 and includes an illumination light source, e.g., a light emitting diode (LED) 42, and an illuminating lens assembly 44 configured to efficiently generate a pattern of illumination light on and along the target 40 to be read by image capture. At least part of the scattered and/or reflected return light is derived from the pattern of illumination light on and along the target 40.

As also shown in FIG. 2, the sensor 30, the LED 42, and the RF module 16 are operatively connected to a controller or microprocessor 46 operative for controlling the operation of these components. A memory 48 is connected and accessible to the controller 46. Preferably, the microprocessor 46 is the same as the one used for processing the return light from the target 40 and for decoding the captured target images when the target is an encoded symbol. In operation, the microprocessor 46 sends a command signal to energize the LED 42 for a short exposure time period, say 500 microseconds or less, and energizes and exposes the sensor 30 to collect the return light, e.g., illumination light and/or ambient light, from the target 40 only during said exposure time period. A typical sensor 30 needs about 18-33 milliseconds to acquire the entire target image and operates at a frame rate of about 30-60 frames per second.

Returning to FIG. 1, an identification symbol 50 is encoded with identification data that identifies a user desiring access to operate one or more of the electrical devices 102, 104, and 106 connected over bi-directional wireless links to the network 22. The identification symbol 50 is printed on a portable medium 52, e.g., a card, a badge, or the like, carried by the user, and is configured as either a one-dimensional Universal Product Code (UPC) symbol, or preferably, as shown, a two-dimensional symbol, e.g., a Quick Response (QR) code, a Portable Data File (PDF) 417 code, a Data Matrix (DM) code, or the like. The printing is performed with ink on a substrate, such as a paper sheet. The imaging sensor 30 is operated by the user to capture an image of the identification symbol 50 (see the displayed image on screen 14), and to store the captured image, for example, in the memory 48.

A composite symbol 100, preferably two-dimensional, is encoded with the aforementioned identification data and with operating data that enables one or more of the electrical devices 102, 104, and 106 to be operated. The composite symbol 100 is associated with each electrical device to be operated. The composite symbol 100, which may be a QR code, a PDF417 code, a DM code, or the like, is displayed in close association with the electrical device to be operated. Preferably, the composite symbol 100 is printed on respective media 112, 114, and 116, e.g., sheets of paper, which are respectively affixed in the vicinity of the electrical devices to be operated. If any electrical device has a screen, then the composite symbol 100 may be displayed thereon.

The imaging sensor 30 is again operated by the user to capture an image of the composite symbol 100 associated with any of the devices 102, 104, and 106, to which the user desires access. Thus, the aforementioned target 40 represents both the identification symbol 50 and the composite symbol 100, whose images are captured at different times. The controller 46 compares the images, and enables the user to operate the electrical device when the identification data in the composite symbol 100 matches the identification data in the identification symbol 50.

The large data storage available in the composite symbol 100 enables multiple users to independently access each electrical device. In effect, the composite symbol 100 serves as a read only memory (ROM). Thus, the composite symbol 100 is preferably encoded with a plurality of identification data from a group of users, each enabled to operate the respective electrical device when the identification data for any individual user in the composite symbol 100 matches the identification data in the identification symbol 50 for that individual user. The ink-printing of the identification symbol 50 and the composite symbol 100 is a very cost-effective authentication technique for commercial users to keep their operational costs down. End-user training, sophisticated support processes, and hardware and software tokens are no longer required.

The devices 102, 104, and 106 have been illustrated as a desktop computer, a printer, and lighting fixtures, preferably with dimmers, respectively, merely for ease of illustration. It will be understood that any network device can be so authenticated and controlled in accordance with this invention. As used herein, the term electrical device signifies any electronic device, or even a mechanical device having an electrical component, such as an electronic controller. Also, in applications requiring even more security, then the images of one or more identification symbols 50 may be required to be captured before being granted access to any one device.

In addition, the large data storage available in the composite symbol 100 enables the composite symbol to also be encoded with Boolean logic data that enables the user to operate the electrical device when a Boolean logic condition with respect to another electrical device has been satisfied. For example, the composite symbol associated with the computer 102 or the printer 104 may be encoded to not operate unless the lighting 106 has already been operated. As another example, the composite symbol associated with the printer 104 may be encoded to not operate unless the computer 102 has already been operated. Thus, the Boolean logic data in the composite symbol serves as a Boolean logic controller and can be made as simple or complex as desired for a particular venue. Examples of Boolean logic conditions include, for example, such logic operators as AND, OR, NOR, NOT, NAND, XOR, and XNOR operators, or a combination of such operators, preferably configured in an algorithm.

Figure 3:
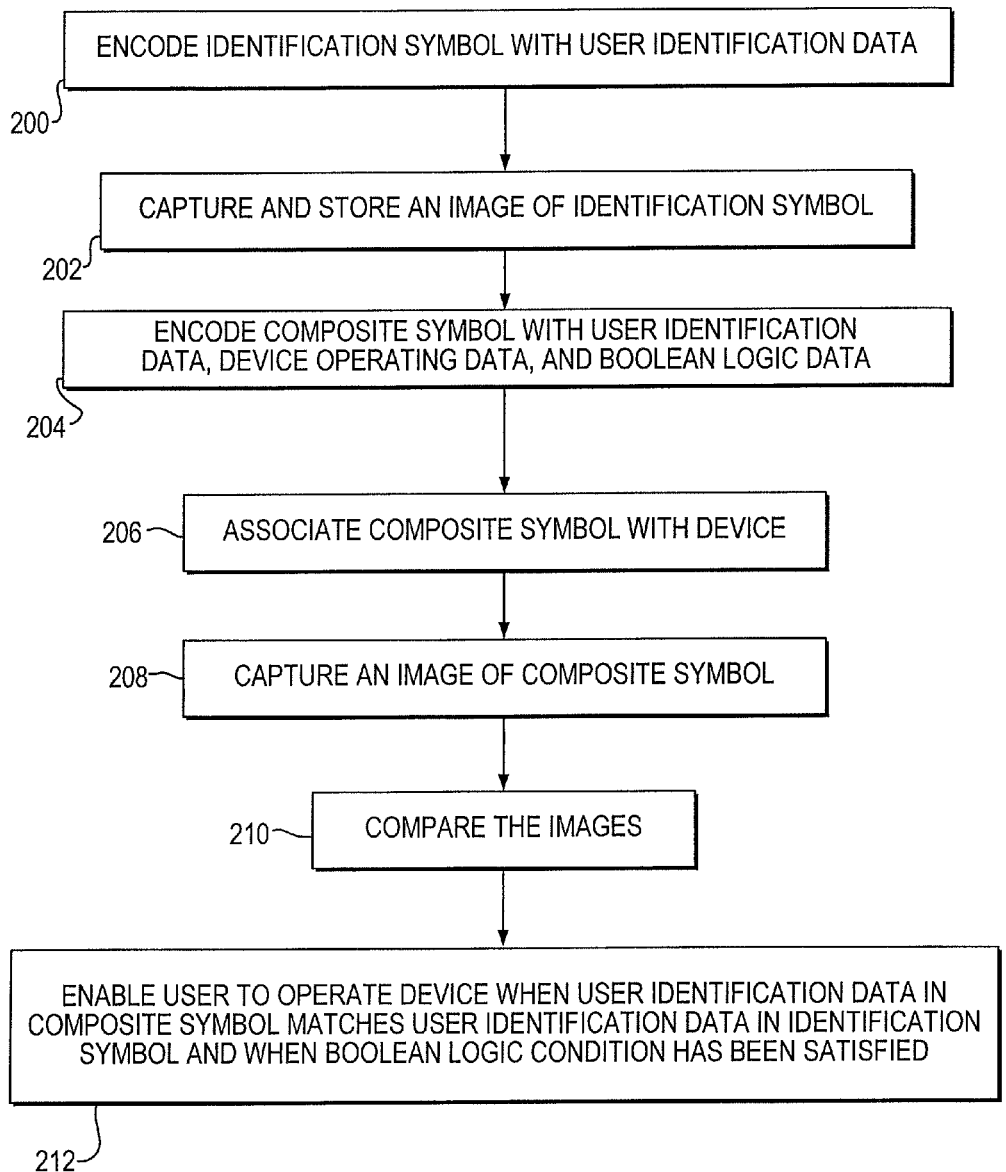
FIG. 3 is a flow chart of a method of authenticating a user to operate one or more electrical devices in a network in accordance with this disclosure.

FIG. 3 depicts a flow chart indicating the steps performed in authenticating the user to operate one or more of the electrical devices 102, 104, and 106 in the network 22. In step 200, the identification symbol 50 is encoded with identification data that identifies the user. In step 202, an image of the identification symbol 50 is captured and stored. In step 204, the composite symbol 100 is encoded with the identification data, and with operating data that enables any electrical device 102, 104, and 106 to be operated, and optionally with the aforementioned Boolean logic data. In step 206, the composite symbol 100 is associated with the electrical device to be operated. In step 208, an image of the composite symbol 100 is captured. In step 210, the images are compared. In step 212, the user is enabled to operate the electrical device when the identification data in the composite symbol 100 matches the identification data in the identification symbol 50, and optionally when the aforementioned Boolean logic condition has been satisfied.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of authenticating a user to operate an electrical network device in a network, comprising:
encoding an identification symbol with identification data that identifies the user;
capturing and storing a first image of the identification symbol by the user operating a solid-state imaging sensor in a mobile communications device that is a different piece of equipment from the electrical network device;
encoding a composite symbol with the identification data and with operating data that enables the electrical network device to be operated;

associating the composite symbol with the electrical network device to be operated;

capturing a second image of the composite symbol by the user again operating the solid-state imaging sensor in the mobile communications device;

comparing the first and second images;

enabling the user to operate the electrical network device when the identification data in the composite symbol matches the identification data in the identification symbol; and operating the electrical network device with the operating data after enabling the user.

2. The method of claim 1, further comprising the step of printing the identification symbol on a portable medium carried by the user.

3. The method of claim 1, further comprising the step of configuring the identification symbol as a two-dimensional symbol.

4. The method of claim 1, further comprising the step of configuring the composite symbol as a two-dimensional symbol.

5. The method of claim 1, wherein the associating of the composite symbol is performed by displaying the composite symbol in close association with the electrical network device to be operated.

6. The method of claim 5, further comprising the step of printing the composite symbol on a medium, and affixing the medium in the vicinity of the electrical network device to be operated.

7. The method of claim 1, wherein the encoding of the composite symbol is performed by encoding the composite symbol with a plurality of identification data from a group of users, each enabled to operate the electrical network device when the identification data for any individual user in the composite symbol matches the identification data in the identification symbol for that individual user.

8. The method of claim 1, wherein the encoding of the composite symbol is performed by encoding the composite symbol with Boolean logic data that enables the user to operate the electrical network device when a Boolean logic condition with respect to another electrical network device has been satisfied.

9. The method of claim 8, wherein the Boolean logic data enables the user to operate the electrical network device only after the other electrical network device has been operated.

10. A system for authenticating a user to operate an electrical network device in a network, comprising:

an identification symbol encoded with identification data that identifies the user;

a composite symbol encoded with the identification data and with operating data that enables the electrical network device to be operated, the composite symbol being associated with the electrical network device to be operated;

a mobile communications device that is a different piece of equipment from the electrical network device, the mobile communications device having a solid-state imaging sensor operated by the user for capturing a first image of the identification symbol, and for capturing a second image of the composite symbol; and a controller for comparing the first and second images, and for enabling the user to operate the electrical network device when the identification data in the composite symbol matches the identification data in the identification symbol.

11. The system of claim 10, wherein the identification symbol is printed on a portable medium carried by the user.

12. The system of claim 10, wherein the identification symbol is configured as a two-dimensional symbol.

13. The system of claim 10, wherein the composite symbol is configured as a two-dimensional symbol.

14. The system of claim 10, wherein the composite symbol is displayed in close association with the electrical network device to be operated.

15. The system of claim 14, wherein the composite symbol is printed on a medium that is affixed in the vicinity of the electrical network device to be operated.

16. The system of claim 10, wherein the composite symbol is encoded with a plurality of identification data from a group of users, each enabled to operate the electrical network device when the identification data for any individual user in the composite symbol matches the identification data in the identification symbol for that individual user.

17. The system of claim 10, wherein the composite symbol is encoded with Boolean logic data that enables the user to operate the electrical network device when a Boolean logic condition with respect to another electrical network device has been satisfied.

18. The system of claim 17, wherein the Boolean logic data enables the user to operate the electrical network device only after the other electrical network device has been operated.

\* \* \* \* \*